United States Patent
Cheo

(10) Patent No.: US 7,107,795 B2
(45) Date of Patent: Sep. 19, 2006

(54) METHOD FOR FORMING HIGH-DENSITY MULTICORE PHASE-LOCKED FIBER LASER ARRAY

(76) Inventor: Peter K. Cheo, 64 Windward Way, Waterford, CT (US) 06385

( * ) Notice: Subject to any disclaimer, the term of this patent is extended or adjusted under 35 U.S.C. 154(b) by 433 days.

(21) Appl. No.: 10/708,049

(22) Filed: Feb. 5, 2004

(65) Prior Publication Data

US 2006/0010920 A1  Jan. 19, 2006

Related U.S. Application Data

(60) Provisional application No. 60/446,271, filed on Feb. 11, 2003.

(51) Int. Cl.
*C03B 37/075* (2006.01)
*G02B 6/02* (2006.01)

(52) U.S. Cl. ............................. 65/390; 65/409; 65/412

(58) Field of Classification Search .................. 65/390, 65/409, 412, 385; 385/126; 372/70
See application file for complete search history.

(56) References Cited

U.S. PATENT DOCUMENTS

| | | | | |
|---|---|---|---|---|
| 4,799,949 A | * | 1/1989 | Keck et al. | 65/409 |
| 4,948,217 A | * | 8/1990 | Keck et al. | 385/24 |
| 5,050,173 A | * | 9/1991 | Hughes | 372/6 |
| 5,353,365 A | * | 10/1994 | Dumas et al. | 385/102 |
| 5,474,553 A | * | 12/1995 | Baumgart | 606/71 |
| 5,566,196 A | * | 10/1996 | Scifres | 372/6 |
| 5,742,722 A | * | 4/1998 | Imoto | 385/126 |
| 5,873,923 A | * | 2/1999 | DiGiovanni | 65/390 |
| 6,031,850 A | | 2/2000 | Cheo | 372/6 |
| 6,154,594 A | * | 11/2000 | Fiacco et al. | 385/126 |
| 6,272,155 B1 | * | 8/2001 | Sekiguchi | 372/6 |
| 6,301,420 B1 | | 10/2001 | Greenaway et al. | 385/126 |
| 7,003,206 B1 | * | 2/2006 | Tankala et al. | 385/127 |
| 7,018,111 B1 | * | 3/2006 | Chiappetta | 385/89 |
| 2003/0108316 A1 | | 6/2003 | Maroney et al. | 385/126 |
| 2003/0197921 A1 | * | 10/2003 | Jiang et al. | 359/341.5 |

OTHER PUBLICATIONS

E. J. Bochove, P. K. Cheo and G. G. King; "Self-organization in a multicore fiber laser array;" Optics Society of America, Optics Letter, vol. 28, No. 14, Jul. 15, 2003; pp. 1-3.

P. K. Cheo, A. Liu, and G. G. King; "A High-Brightness Laser Beam From a Phase-Locked Multicore Yb-Doped Fiber Laser Array;" IEEE Phontonics Technology Letters, vol. 13, No. 5, May 2001; pp. 439-441.

R. f. Cregan, B. J. Mangan, J. C. Knight, t. A. Birks, P. St. J. Russell, P. J. Roberts, D. C. Allan; "Single-Mode Photonic Band Gap Guidance of Light in Air;" Science Magazine, vol. 285; Sep. 1999; pp. 1537-1539.

R. J. Tonucci, B. L. Justus, A. J. Campillo, C. E. Ford; "Nanochannel Array Glass;" Science Magazine; vol. 258; Oct. 1992; pp. 783-785.

* cited by examiner

*Primary Examiner*—Carlos Lopez
(74) *Attorney, Agent, or Firm*—Cantor Colburn LLP

(57) ABSTRACT

A method for forming a multicore fiber laser array includes inserting a plurality of rare-earth doped rods into a corresponding plurality of hollow capillaries, and arranging the resulting plurality of filled capillaries into a preform pattern. The plurality of filled capillaries are collapsed into an initial preform structure, wherein a portion of the material of the capillaries forms an initial inner cladding. The initial preform structure is inserted into a cylinder, wherein the cylinder and the initial preform structure are fused so as to form a final preform structure with a final inner cladding having an increased thickness with respect to the initial inner cladding. At least one flat surface is formed along the length of the final preform structure, and a fiber is simultaneously drawn from the final preform structure and a layer of outer cladding material.

20 Claims, 4 Drawing Sheets

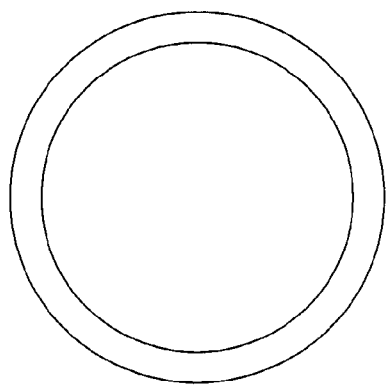
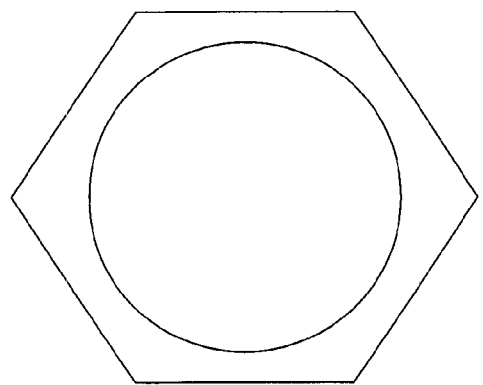
Fig. 2
Fig. 3
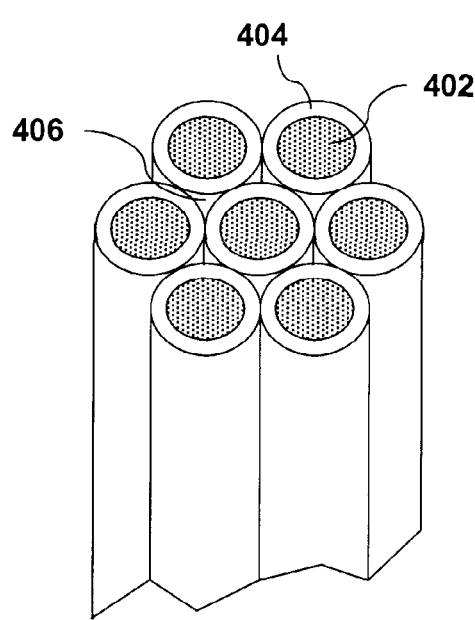
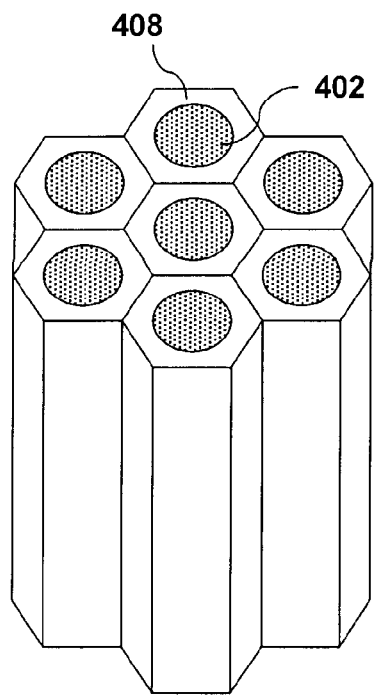
Fig. 4(a)
Fig. 4(b)

US 7,107,795 B2

METHOD FOR FORMING HIGH-DENSITY MULTICORE PHASE-LOCKED FIBER LASER ARRAY

CROSS REFERENCE TO RELATED APPLICATIONS

This application claims the benefit of U.S. provisional application No. 60/446,271, filed Feb. 11, 2003, the contents of which are incorporated by reference herein in their entirety.

BACKGROUND OF INVENTION

The present invention relates generally to optical fiber manufacturing and, more particularly, to a method for forming a high-density, multicore phase-locked fiber laser array.

There are many applications for high power lasers in areas such as marking, drilling, cutting, welding, ablation, sensing, imaging, medical/dental surgery, as well as military applications. For example, clad-pumped fiber lasers use rare earth ions (e.g., Ytterbium (Yb)) as the lasing medium, operating at wavelengths below 1.5 microns ($\mu m$). Additionally, using Erbium (Er) and Holmium (Ho) ions (which have eye-safe wavelengths above 1.5 $\mu m$), lasing occurs between a first excited state and the ground state. As such, lasing cannot be sustained unless the cavity loss due to the ground state absorption at the lasing wavelength is offset by co-doping the system(s) with either Ytterbium to form Yb—Er or Thulium to form Tm—Ho.

Attempts to increase clad-pumped fiber laser power have included the use of multiple cores. However, the output power of previously formed multiple core lasers (or large mode area LMA fiber lasers in particular) in the kilowatt range is usually either incoherent or distributed in multiple beam spots (commonly referred to as "higher-order modes") as a result. Another problem with clad-pumped fiber lasers is that the pump power is usually injected into the inner cladding of a double-clad fiber laser through two end facets. Furthermore, the same energy eventually to be absorbed by the core(s) (so as to pump the lasing medium) is also traveling a great distance within the cladding, which can also absorb a significant amount of the energy as the length of the fiber becomes too long.

Therefore, although increasing the length of the laser fiber will increase the exposure of the core to the energy to be absorbed thereby, the increased length also increases the amount of energy absorbed in the cladding, by some efficiency ratio. Although lasers formed in coils of lengths in the kilometer regime have been known, they are not very efficient. To mitigate this problem, side-pumping through multiple ports along a long length of a clad-pumped fiber laser has been introduced.

Furthermore, earlier approaches to fabricating multicore fiber laser arrays have employed techniques such as precision-machining a glass clad rare-earth doped rod into a hexagonal shape and then cutting the rod into many pieces. The cut pieces are bundled together and fused to form a multicore preform. Other techniques include precision hole drilling a large glass rod and filling the holes with rare-earth doped cores. However, as the number of desired cores increases, such methods become very labor-intensive and are difficult to apply. Because these earlier arrays were produced by abrasive methods, the introduction of microfractures in the core region is also a distinct possibility.

Accordingly, there is a need for forming a multicore high-power fiber laser array in an economical and non-abrasive manner, such that the array features a substantially defect-free, isometric multicore structure. Moreover, the cores of the fiber should be disposed at a relatively equal distance from one another, and should be configured in a manner to produce a phase-locked output beam in favor of the fundamental in-phase supermode emerging as a high-brightness beam from the multicore fiber laser array.

SUMMARY OF INVENTION

The foregoing discussed drawbacks and deficiencies of the prior art are overcome or alleviated by a method for forming a multicore fiber preform structure. In an exemplary embodiment, the method includes inserting a plurality of rare-earth doped rods into a corresponding plurality of hollow capillaries. A resulting plurality of filled capillaries are arranged into a preform pattern, and are collapsed into an initial preform structure, wherein a portion of the material of the capillaries forms an initial inner cladding. The initial preform structure is inserted into a cylinder, and the cylinder and initial preform structure are fused so as to form a final preform structure with a final inner cladding having an increased thickness with respect to the initial inner cladding.

In another embodiment, a method for forming a multicore fiber laser array includes inserting a plurality of rare-earth doped rods into a corresponding plurality of hollow capillaries, and arranging the resulting plurality of filled capillaries into a preform pattern. The plurality of filled capillaries are collapsed into an initial preform structure, wherein a portion of the material of the capillaries forms an initial inner cladding. The initial preform structure is inserted into a cylinder, wherein the cylinder and the initial preform structure are fused so as to form a final preform structure with a final inner cladding having an increased thickness with respect to the initial inner cladding. At least one flat surface is formed along the length of the final preform structure, and a fiber is simultaneously drawn from the final preform structure and a layer of outer cladding material.

BRIEF DESCRIPTION OF DRAWINGS

Referring to the exemplary drawings wherein like elements are numbered alike in the several Figures:

FIG. 2 is a cross-sectional view of one of a plurality of circular glass/silica capillary tubes that may be used to initially house a rare-earth doped rod therein, in accordance with an embodiment of the invention;

FIG. 3 is an alternative embodiment of FIG. 2, in which the capillaries used to house the doped rods are hexagonally shaped;

FIG. 4(a) is a perspective view of plurality of rod-filled circular capillaries as shown in FIG. 2, arranged in a packed, hexagonal preform pattern prior to fusing thereof;

FIG. 4(b) is a perspective view of plurality of rod-filled hexagonally shaped capillaries as shown in FIG. 3, arranged in a packed, hexagonal preform pattern prior to fusing thereof;

DETAILED DESCRIPTION

Disclosed herein is a method of forming a high-density, multicore (e.g., greater than 100 individual cores) phase-locked fiber laser array configured to emit a highly coherent, in-phase beam at an output power capable of exceeding tens of kilowatts. Briefly stated, a plurality of glass (or pure silica) tubes/capillaries are filled with rare-earth doped silica rods, which are thereafter fusion-collapsed. The formation of the doped silica rods may be facilitated by using a standard modified chemical vapor deposition (MCVD) process. While the initial shape of the capillaries may be either cylindrical or hexagonal, using hexagonally shaped capillaries results in a packing fraction of unity.

As will be appreciated, the presently disclosed method of producing such a multicore fiber preform avoids the tedious and abrasive precision-lapping process of machining the doped rods and precision hole-drilling of the clad material, both of which can lead to breakage or introduce stress-induced defects. The fused multicore (e.g., hexagonal) structure containing individual rare-earth doped cores is then inserted into a larger silica (or other material with a properly chosen refractive index) cylinder that provides an additional thickness to the inner cladding material initially created by fusion of the silica capillaries. A final preform is then formed by fusing the multicore structure and the additional inner cladding material together. A double-clad, multicore fiber may then be drawn from the final preform by simultaneously extruding the multicore preform material and an outer cladding material (with a very low refractive index or having a ring of air holes to separate the inner and outer claddings) to produce a large numerical aperture for the inner cladding.

In a high-power application, the resulting fiber is configured to have at least one large, flat surface for accommodating a plurality of side-couplers. The side couplers allow for the launching of a large amount of pump power into the fiber laser, at an injection efficiency greater than 90% along a long length of the fiber. As such, a further aspect of the invention provides for a final preform having at least one flat surface, such as embodied by a square, a rectangular or a D-shape, for example.

Figure 1:
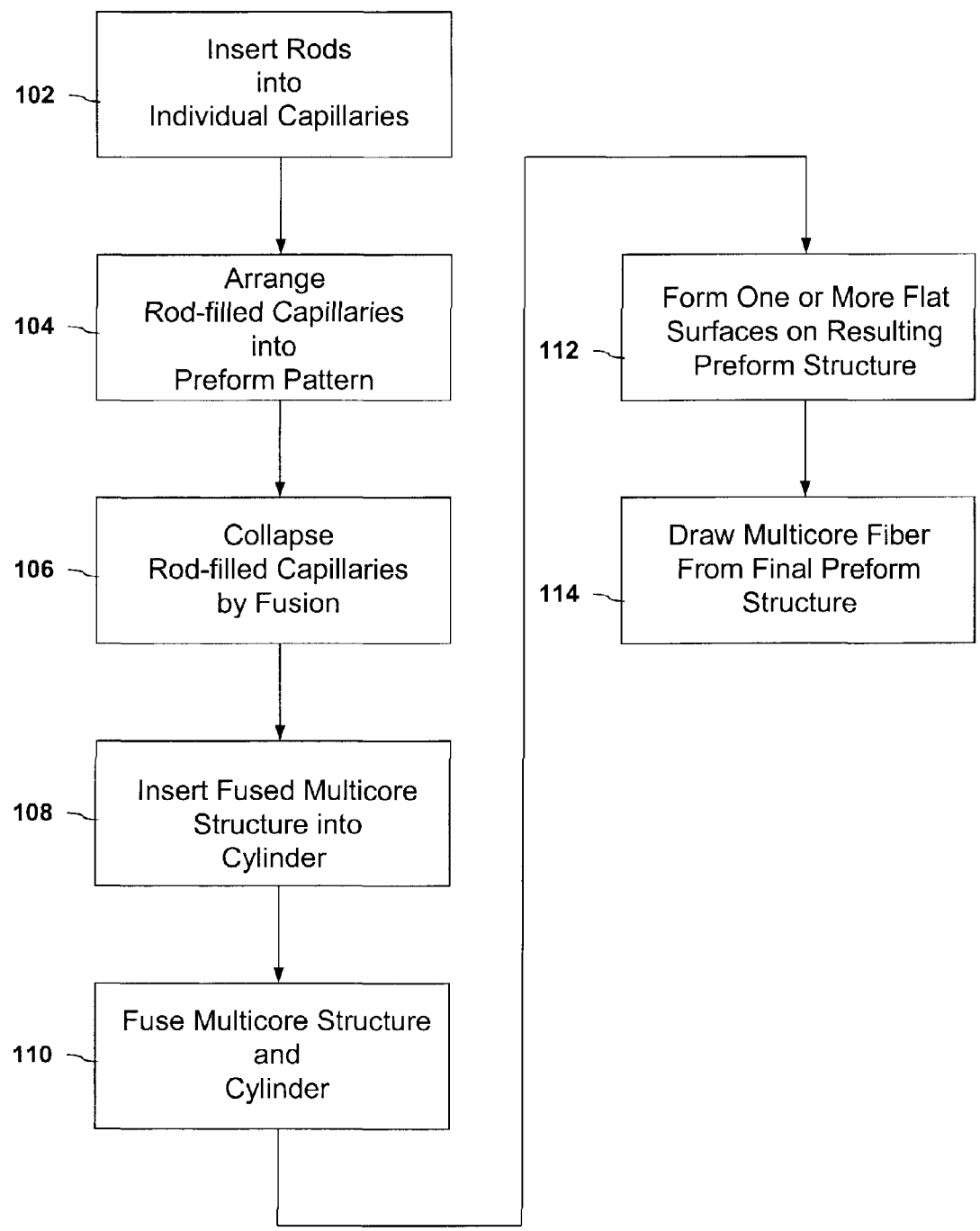
FIG. 1 is a process flow diagram of a method for forming a high-density, multicore fiber laser array, in accordance with an embodiment of the invention.

Referring initially to FIG. 1, there is shown a process flow diagram of a method 100 for forming a high-density, multicore fiber laser array, in accordance with an embodiment of the invention. As shown in block 102, a large number (e.g., on the order of several hundred or more) of capillary tubes of silica glass are filled with a corresponding number of rare-earth doped silica rods. The doped rods may be produced, for example, through MCVD. Although the capillaries may be circular in initial shape (as shown in the cross-sectional view of FIG. 2), the collapsing of such could result in the formation of minute, interstitial holes therebetween if circular capillaries are used. Alternatively, to avoid the formation of interstitial holes, hexagonally shaped capillaries may be used, as shown in FIG. 3.

Next, the rod-filled capillaries are then arranged and stacked together to form a packed, hexagonal preform pattern as shown in block 104 of FIG. 1. Where the capillaries are circular shaped, a portion of the packed hexagonal preform pattern is illustrated in FIG. 4(a); if hexagonal capillaries are used, the preform pattern is illustrated in FIG. 4(b). Again, it will be seen from FIG. 4(a) that the when the doped rods 402 are inserted into circular capillaries 404, the hexagonal packing thereof still results in small interstitial spaces 406 therebetween. In contrast, the use of hexagonal capillaries 408 of FIG. 4(b) results in gapless spacing therebetween.

Figure 5:
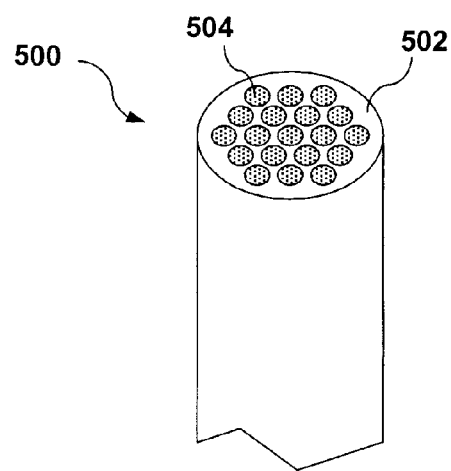
FIG. 5 is a perspective view of a fused multicore structure/initial preform structure following the collapsing of hexagonally arranged, filled capillaries.

Regardless of the shape of the capillaries, the eventual core diameter and core separation of a multicore fiber subsequently drawn from the completed preform can be regulated to sub-micron precision with extremely uniform array geometry. Proceeding to block 106 of FIG. 1, once the rod-filled capillaries are arranged into the hexagonal preform pattern, they are collapsed (i.e., fused) under high temperature and pressure conditions to form a fused multicore structure or "intermediate" preform structure 500, as illustrated in the exemplary embodiment of FIG. 5. The glass/silica material used for each of the individual capillaries has fused together to form an initial inner cladding 502 having an initial thickness, while the individual doped rods are now configured as a plurality of individual cores 504 that collectively define a multicore structure. It should be understood that the intermediate preform structure 500 shown in FIG. 5 is not depicted to scale, and that there are only a relatively small number of cores shown for the sake of simplicity.

Figure 6:
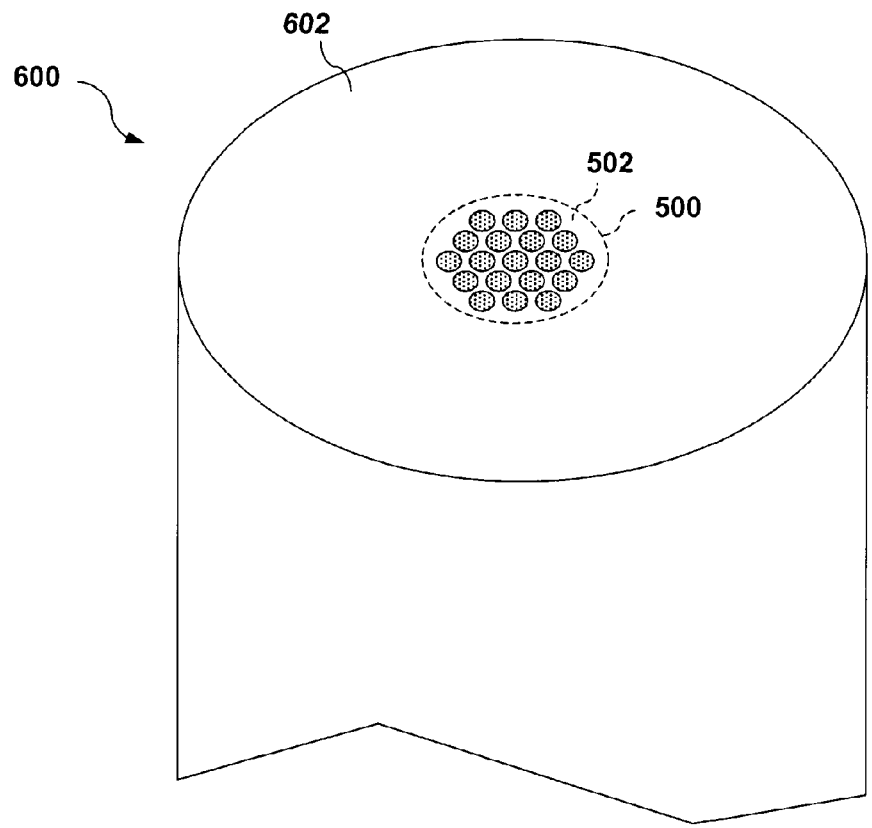
FIG. 6 is a perspective view of the resulting preform structure following the fusion of the initial preform structure with a larger cylinder material so as to enlarge the inner cladding.

Referring once again to FIG. 1, the fused multicore structure/intermediate preform structure 500 is then inserted into a larger cylinder, as shown in block 108. The larger cylinder is preferably formed from the same material as the smaller diameter, individual capillaries, and will provide a larger inner cladding area following the fusing of the larger cylinder material with the initially fabricated multicore structure 500, as shown in block 110 of FIG. 1. FIG. 6 illustrates the resulting preform structure 600 after the intermediate preform structure 500 is fused with a larger diameter cylinder to create a final inner cladding 602 having an increased thickness with respect to the initial inner cladding 502. For applications such as multiple coupled waveguides, the circular structure 600 could be used as a final preform from which individual fibers are drawn.

Figure 7A:
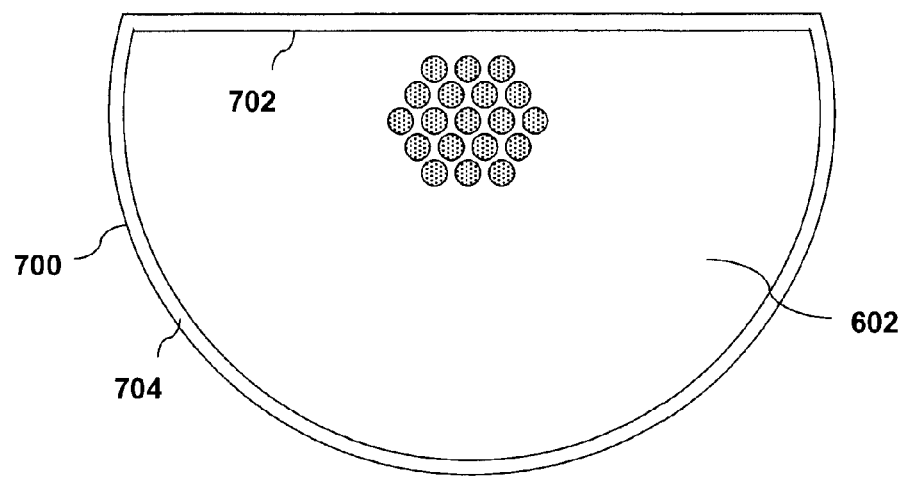
FIG. 7(a) is an end view of a double-clad, multicore fiber having a D-shape suitable for side pumped lasers.

However, as stated previously, for producing a uniform gain over a very long fiber length, it is desirable to be able to utilize multiple side-couplers along the length of a drawn fiber so as to allow facilitate a more efficient injection of the pump power into the multicores. Thus, as shown in block 112 of FIG. 1, at least one flat surface is formed along the length of the preform structure 600 to create a final preform. In one particular embodiment, as shown in FIG. 7(a), a circular fiber 700 having a flat surface 702 is drawn from a circular preform having a flat surface formed thereon by planarizing a chord of the cross-sectional area thereof so to create a "D-shape". In addition, the D-shaped fiber 700 also includes a thin outer cladding 704 that serves as a waveguide for the pump power.

Figure 7B:
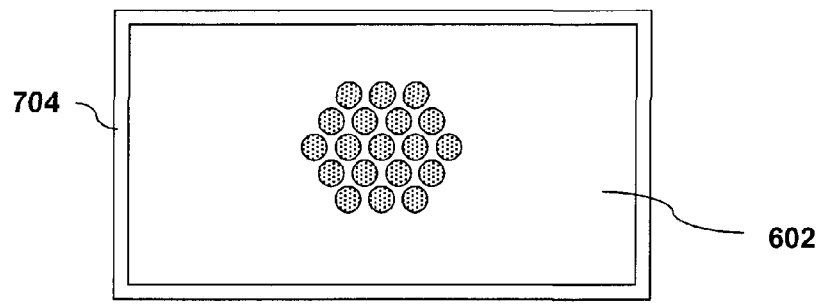
FIG. 7(b) is an end view of a double-clad, multicore fiber having a rectangular shape for high power applications.
Figure 7C:
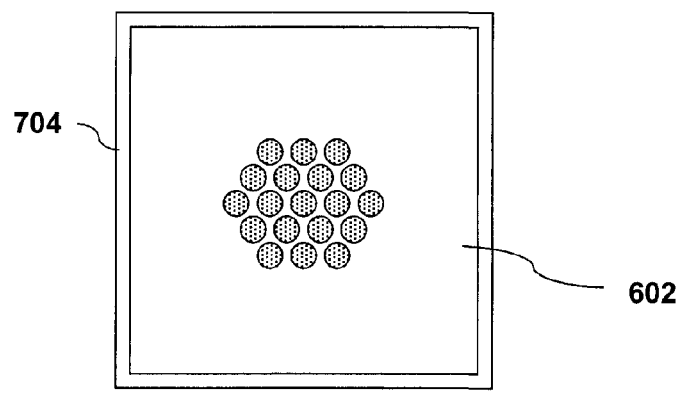
FIG. 7(c) is an end view of a double-clad, multicore fiber having a square shape for high power applications.

Other embodiments, however, are also possible. For example, the final preform may be made into a rectangular configuration to produce the fiber shown in FIG. 7(b), or into a square configuration as shown by the fiber of FIG. 7(c). Other shapes for the final preform are also contemplated, however, so long as a large flat surface is ultimately provided on the drawn fiber for injecting the pump laser radiation into the inner cladding, along the length of the fiber and through the sidewall thereof.

Finally, as shown in block 114 of FIG. 1, a multicore fiber is drawn from the final preform structure. The drawing of fiber from the final preform structure may be implemented in accordance with techniques known to those skilled in the art, such as by heating the fiber preform to very high temperature (e.g., about 2000° C.) in a drawing tower and pulling the fiber down to a desired diameter. Thus configured, a large number (e.g., >100) of multicore fiber lasers embedded in a common cladding can be spontaneously phase-locked to emit a highly coherent beam at an output power greater than tens of kilowatts. Furthermore, the formation of the final preform structure in this manner is designed to prevent all phase-locked supermodes from being emitted. To this end, various fiber parameters are well specified and fabricated, including for example, V-value, core separation, nonlinear refractive index n2, and the numerical aperture of the cores and claddings.

With properly chosen fiber parameters, the in-phase supermode in the form of a high-brightness beam becomes the dominant one with the help of a non-linear change of the refractive index n2, when the laser is operating under high pump power. If the inner cladding 602 has a refractive index of 1.45, for example, then the index for the outer cladding 704 may be chosen to yield a large numerical aperture (NA) value (e.g., about 0.5). With a larger NA value, more efficient injection of the pump power into the fiber from the side wall(s) is possible.

As will be appreciated, the above described formation process 100 may be used to produce over hundreds or thousands of cores by stacking as many filled capillaries as desired. As the method initially involves only thermal fusion processes, it avoids any mechanical and abrasive steps in producing the individual cores separately. The only step involving a mechanical process is implemented for side-pumping couplers in producing a large flat surface on the final preform. However, such surface planarizing is carried out well away from the region where the cores are located, as a result of the additional thickness of the final inner cladding 602. As such, no mechanical or stress-induced defects are expected in the region where lasing occurs.

Where such a high power application is desired, (e.g., a fiber laser array having 127 Yb-doped cores arranged in 7 isometric rings, and embedded in a common cladding with a flat surface of >400 mm in width), the fiber laser fabricated in accordance with the above described method can yield an output power greater than 10 KW in a high-brightness beam having an $M^2$ value very close to unity. The $M^2$ value of a beam is defined as the ratio of the actual beam width to an ideal diffraction-limited beam width, as they propagate through free space. For a good quality beam, the $M^2$ value is very close to 1. If the fiber parameters of a multicore fiber are improperly selected, then the resulting $M^2$ value of the beam will be larger then 1.

Two such significant fiber parameters include the V-value (V) of the core and core separation, s (from center to center). In the case of a 7-core fiber laser with s=1.5 d (where d is the diameter of the core), the $M^2$ value is 1.63 if V=1.73. In the case of a 19-core fiber laser with s=1.5 d, the $M^2$ value is 1.7 if V=1.4, and so on. In general, it is very difficult to produce good quality multicore fiber since it requires sub-micron precision to properly produce these desired parameters correctly. By utilizing the above described method embodiments for manufacturing over hundreds of rare-earth doped cores, arranged in a configuration with sub-micron precision, the laser output beam may have a $M^2$ value very close to unity. Furthermore, the fibers thus produced will not suffer any abrasive treatment. As a result, the fiber will be defect-free from micro-fracture, so that it can be operated under extremely high power without suffering catastrophic failure.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method for forming a multicore fiber preform structure, the method comprising:
   inserting a plurality of rare-earth doped rods into a corresponding plurality of hollow capillaries;
   arranging a resulting plurality of filled capillaries into a preform pattern;
   collapsing said plurality of filled capillaries into an initial preform structure, wherein a portion of the material of said capillaries forms an initial inner cladding;
   inserting said initial preform structure into a cylinder; and
   fusing said cylinder and said initial preform structure so as to form a final preform structure with a final inner cladding having an increased thickness with respect to said initial inner cladding.

2. The method of claim 1, wherein said hollow capillaries are formed from silica.

3. The method of claim 1, wherein said filled capillaries are arranged into a hexagonal pattern.

4. The method of claim 3, wherein said hollow capillaries have a circular cross-sectional shape.

5. The method of claim 4, wherein said hollow capillaries have a hexagonal cross-sectional shape.

6. The method of claim 1, further comprising forming at least one flat surface along the length of said final preform structure.

7. The method of claim 6, wherein said final preform structure comprises a D-shaped cross section.

8. The method of claim 6, wherein said final preform structure comprises a rectangular cross section.

9. The method of claim 6, wherein said final preform structure comprises a square cross section.

10. The method of claim 1, wherein said capillaries and said cylinder are chosen such that said final inner cladding has an equivalent index of refraction as said initial inner cladding.

11. A method for forming a multicore fiber laser array, the method comprising:
    inserting a plurality of rare-earth doped rods into a corresponding plurality of hollow capillaries;
    arranging a resulting plurality of filled capillaries into a preform pattern;
    collapsing said plurality of filled capillaries into an initial preform structure, wherein a portion of the material of said capillaries forms an initial inner cladding;
    inserting said initial preform structure into a cylinder;
    fusing said cylinder and said initial preform structure so as to form a final preform structure with a final inner cladding having an increased thickness with respect to said initial inner cladding;
    forming at least one flat surface along the length of said final preform structure; and simultaneously drawing a fiber from said final preform structure and from a layer of outer cladding material.

12. The method of claim 11, wherein said hollow capillaries are formed from silica.

13. The method of claim 11, wherein said filled capillaries are arranged into a hexagonal pattern.

14. The method of claim 13, wherein said hollow capillaries have a circular cross-sectional shape.

15. The method of claim 14, wherein said hollow capillaries have a hexagonal cross-sectional shape.

16. The method of claim 11, wherein number of said plurality of filled capillaries in said initial preform structure is about 100 or more.

17. The method of claim 11, wherein said final preform structure comprises a D-shaped cross section.

18. The method of claim 11, wherein said final preform structure comprises a rectangular cross section.

19. The method of claim 11, wherein said final preform structure comprises a square cross section.

20. The method of claim 11, wherein said capillaries and said cylinder are chosen such that said initial inner cladding has and equivalent index of refraction as said final inner cladding, and wherein said final inner cladding has a different index of refraction than said outer cladding material.

* * * * *